United States Patent
Oh et al.

(10) Patent No.: US 11,681,921 B2
(45) Date of Patent: Jun. 20, 2023

(54) METHOD OF OUTPUTTING PREDICTION RESULT USING NEURAL NETWORK, METHOD OF GENERATING NEURAL NETWORK, AND APPARATUS THEREFOR

(71) Applicant: SAMSUNG ELECTRONICS CO., LTD., Suwon-si (KR)

(72) Inventors: Do-kwan Oh, Hwaseong-si (KR); Cheol-hun Jang, Pohang-si (KR); Dae-hyun Ji, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 808 days.

(21) Appl. No.: 16/660,228

(22) Filed: Oct. 22, 2019

(65) Prior Publication Data
US 2020/0134427 A1    Apr. 30, 2020

(30) Foreign Application Priority Data

Oct. 30, 2018    (KR) .......................... 10-2018-0130545

(51) Int. Cl.
| | |
|---|---|
| G06N 3/08 | (2023.01) |
| G06N 3/084 | (2023.01) |
| G06N 20/20 | (2019.01) |
| G06F 18/214 | (2023.01) |
| G06N 3/045 | (2023.01) |
| G06V 10/764 | (2022.01) |
| G06V 10/778 | (2022.01) |
| G06V 10/82 | (2022.01) |
| G06V 10/44 | (2022.01) |
| G06V 20/56 | (2022.01) |

(52) U.S. Cl.
CPC ......... *G06N 3/084* (2013.01); *G06F 18/2155* (2023.01); *G06N 3/045* (2023.01); *G06N 20/20* (2019.01); *G06V 10/454* (2022.01); *G06V 10/764* (2022.01); *G06V 10/7788* (2022.01); *G06V 10/82* (2022.01); *G06V 20/56* (2022.01)

(58) Field of Classification Search
CPC ............................... G06N 3/02; A61B 6/5223
USPC .......................................... 382/157; 455/450
See application file for complete search history.

(56) References Cited

U.S. PATENT DOCUMENTS

| | | | |
|---|---|---|---|
| 9,132,547 B2 | 9/2015 | Jang et al. | |
| 2008/0301077 A1* | 12/2008 | Fung ...................... | G16H 50/20 706/46 |

(Continued)

FOREIGN PATENT DOCUMENTS

KR    10-2013-0083099 A    7/2013

OTHER PUBLICATIONS

Aron Culotta et al., "Tractable Learning and Inference with High-Order Representations", ICML Workshop on Open Problems in Statistical Relational Learning, Pittsburgh, PA, 2006, 8 pages.

(Continued)

*Primary Examiner* — Kiet M Doan
(74) *Attorney, Agent, or Firm* — Sughrue Mion, PLLC

(57) ABSTRACT

A method of generating a second neural network model according to an example embodiment includes: inputting unlabeled input data to a first neural network model; obtaining prediction results corresponding to the unlabeled input data based on the first neural network model; and generating a second neural network model based on the prediction results of the first neural network model and a degree of distribution of the prediction results.

12 Claims, 7 Drawing Sheets

(56) References Cited

U.S. PATENT DOCUMENTS

| | | | |
|---|---|---|---|
| 2017/0359418 A1 | 12/2017 | Sustaeta et al. | |
| 2018/0240031 A1* | 8/2018 | Huszar | G06N 7/005 |
| 2018/0365532 A1* | 12/2018 | Molchanov | G06N 3/084 |
| 2019/0034764 A1 | 1/2019 | Oh et al. | |
| 2019/0147610 A1* | 5/2019 | Frossard | G06V 20/58 |
| | | | 382/103 |
| 2019/0206090 A1* | 7/2019 | Ray | G06F 12/023 |
| 2019/0384047 A1* | 12/2019 | Johnson | A61B 5/0275 |

OTHER PUBLICATIONS

Charles Blundell et al., "Weight Uncertainty in Neural Networks", Proceedings of the 32nd International Conference on Machine Learning, W&CP, vol. 37, Lille, France, May 21, 2015, 10 pages.

Chuan Guo et al., "On Calibration of Modern Neural Networks", Proceedings of the 34th International Conference on Machine Learning, Sydney, Australia, PMLR 70, Aug. 3, 2017, 14 pages.

Geoffrey Hinton et al., "Distilling the Knowledge in a Neural Network", Mar. 9, 2015, pp. 1-9.

Alex Kendall et al., "What Uncertainties Do We Need in Bayesian Deep Learning for Computer Vision?", 31st Conference on Neural Information Processing Systems (NIPS 2017), 2017, Long Beach, CA, USA, 11 pages.

* cited by examiner

METHOD OF OUTPUTTING PREDICTION RESULT USING NEURAL NETWORK, METHOD OF GENERATING NEURAL NETWORK, AND APPARATUS THEREFOR

CROSS-REFERENCE TO THE RELATED APPLICATION

This application claims the benefit of Korean Patent Application No. 10-2018-0130545, filed on Oct. 30, 2018, in the Korean Intellectual Property Office, the disclosure of which is incorporated herein in its entirety by reference.

BACKGROUND

The inventive concept relates to a method of outputting a prediction result using a neural network, a method of generating the neural network, an apparatus for outputting a prediction result using a neural network, and an apparatus for generating the neural network.

Recent developments in deep learning have greatly improved accuracy, and some tasks performed by deep learning exceed human precision. Due to the advantages of deep learning, high attentions are being paid to autonomous technologies. Among the autonomous technologies, camera-based image recognition is a technology that is based on deep learning. The camera-based image recognition requires a large amount of training data due to the nature of deep learning. Training data for deep learning is composed of a pair of input and output. For example, the input in the field of image recognition may be an image obtained by a front camera of a vehicle, and the output may be information (e.g., location, class, etc.) of objects located in front of the vehicle and captured in the image obtained by the front camera. A user may generate a label or annotation from the output based on the user's judgment. It requires a lot of costs (e.g., time, effort, etc.) to generate the label or annotation of the output. In order to improve accuracy, the structure of deep learning needs to be deeper and wider, and the amount of training data needs to be larger accordingly. Thus, the deep learning capability is often represented by an amount of data retention rather than deep learning techniques.

SUMMARY

One or more exemplary embodiments provide a method of outputting a prediction result using a neural network, a method of generating the neural network, an apparatus for outputting a prediction result using a neural network, and an apparatus for generating the neural network.

According to an aspect of an example embodiment, there is provided a method of generating a neural network model, the method including: inputting unlabeled input data to a first neural network model; obtaining prediction results corresponding to the unlabeled input data based on the first neural network model; and generating a second neural network model based on the prediction results and a degree of distribution of the prediction results.

The first neural network model may include a plurality of nodes, and the obtaining may include: randomly dropping out at least a portion of the plurality of nodes of the first neural network model to repeatedly obtain the prediction results corresponding to the unlabeled input data.

The obtaining may include: obtaining an average of the repeatedly obtained prediction results; and determining a pseudo label of the unlabeled input data based on the average of the prediction results.

The generating the second neural network model may include: training the second neural network model based on a value obtained by multiplying the prediction results of the first neural network model by distribution information of the prediction results.

The training may include: training the second neural network model by applying a weight to the prediction results, the weight being proportional to the distribution information of the prediction results.

The obtaining may include, in response to the unlabeled input data being an image: predicting a class of an object included in the unlabeled input data; and predicting a bounding box for detecting the object included in the unlabeled input data.

The obtaining may include, in response to the unlabeled input data being voice: recognizing the voice included in the unlabeled input data.

The generating may include generating the second neural network model that corresponds to a result of on-device learning based on the first neural network model or a result of domain adaptation based on the first neural network model.

According to an aspect of an example embodiment, provided is a method of outputting prediction results using a neural network, the method including: receiving object data; outputting second prediction results corresponding to the object data using a second neural network model, the second neural network model being generated based on a first neural network model, the second prediction results including: a first section indicating that the object data corresponds to a pseudo label corresponding to first prediction results of the first neural network model, a second section in which it is unknown that the object data corresponds to the pseudo label corresponding to the first prediction results, and a third section indicating that the object data does not correspond to the pseudo label corresponding to the first prediction results, wherein the first section, the second section, and the third section are determined based on a degree of distribution of the second prediction results, wherein the outputting the second prediction results including outputting the second prediction results corresponding to the first section, the second section, and the third section.

The second neural network model may be trained by a weight according to a degree of distribution of the first prediction results obtained by the first neural network model.

According to an aspect of an example embodiment, provided is a non-transitory computer readable storage medium storing computer program, which, when executed by at least one processor, causes the at least one processor to execute the method above.

According to an aspect of an example embodiment, provided is an apparatus for generating a neural network model, the apparatus including: a communication interface configured to receive unlabeled input data; and at least one processor configured to input the unlabeled input data to a first neural network model, obtain prediction results corresponding to the unlabeled input data based on the first neural network model, and generate a second neural network model based on the prediction results and a degree of distribution of the prediction results.

The first neural network model may include a plurality of nodes, and the at least one processor may be configured to randomly drop out at least a portion of the plurality of nodes of the first neural network model to repeatedly obtain the prediction results corresponding to the unlabeled input data.

The at least one processor may be configured to obtain an average of the repeatedly obtained prediction results and to determine a pseudo label of the unlabeled input data based on the average of the prediction results.

The at least one processor may be configured to train the second neural network model based on a value obtained by multiplying the prediction results of the first neural network model by distribution information of the prediction results.

The at least one processor may be configured to train the second neural network model by applying a weight to the prediction results, the weight being proportional to the distribution information of the prediction results.

The at least one processor, in response to the unlabeled input data being an image, may be configured to: predict a class of an object included in the unlabeled input data; and predict a bounding box for detecting the object included in the unlabeled input data, or predict the class of the object included in the unlabeled input data and the bounding box for detecting the object included in the unlabeled input data.

The at least one processor, in response to the unlabeled input data being voice, may be configured to recognize the voice included in the unlabeled input data.

According to an aspect of an example embodiment, provided is an apparatus for outputting prediction results, the apparatus including: a communication interface configured to receive object data; and at least one processor configured to output second prediction results corresponding to the object data using a second neural network model, the second neural network model being generated based on a first neural network model, the second prediction results including: a first section indicating that the object data corresponds to a pseudo label corresponding to first prediction results of the first neural network model, a second section in which it is unknown that the object data corresponds to the pseudo label corresponding to the first prediction results, and a third section indicating that the object data does not correspond to the pseudo label corresponding to the first prediction results, wherein the first section, the second section, and the third section are determined based on a degree of distribution of the second prediction results, wherein the at least one processor is configured to output the second prediction results including outputting the second prediction results corresponding to the first section, the second section, and the third section.

The second neural network model may be trained by a weight according to a degree of distribution of the first prediction results obtained by the first neural network model.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
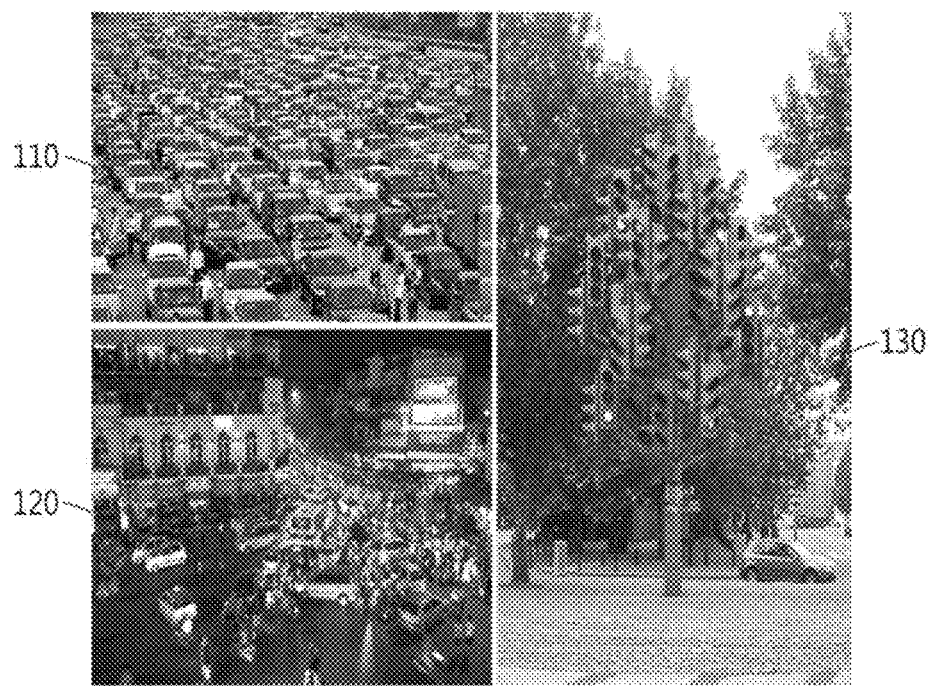
FIG. 1 is a view of examples of road conditions in different countries.

Reference will now be made in detail to embodiments, examples of which are illustrated in the accompanying drawings. However, the inventive concept is not limited thereto. In the drawings, the same elements are denoted by the same reference numerals.

Various modifications may be made to the example embodiments described later below. However, this does not limit the inventive concept within specific embodiments and it should be understood that the inventive concept covers all the modifications, equivalents, and replacements within the idea and technical scope of the inventive concept.

The terms used in the embodiments are for the purpose of describing certain embodiments and are not intended to limit the embodiments. As used herein, the singular forms "a", "an", and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Various applications have been developed to analyze an input image and predict a desired result according to the development of deep learning. For example, the accuracy of an application for analyzing a driving image of a vehicle and generating a driving parameter or driving assistance information is improved. Deep learning performance may be very high in situations similar to data used for training (in-distribution), but performance degradation may occur due to over-confident characteristics of deep learning in situations not known in the training (out-of-distribution). The more data are used for training, deep learning performance may be better, but there is a need for technology for selecting data or information that is useful for training.

FIG. 1 is a view of examples of road conditions in different countries. FIG. 1 shows an image 110 representing a highway in China, an image 120 representing an intersection in Vietnam, and an image 130 representing a signal lamp in the United Kingdom. When road conditions differ by country and a neural network trained based on data of one country is used directly in another country, it may be difficult to trust a prediction result of the neural network.

For example, it is assumed that a Korean development team has developed autonomous technology that shows near-perfect accuracy in Korea at a high cost. However, when autonomous vehicles developed in Korea are developed based on traffic facilities, infrastructure, and traffic regulations of Korea, it is difficult to apply them to traffic conditions in other countries such as China, Vietnam, and the U.K. as shown in the image 110, the image 120, and the image 130. This is because deep learning is excessively adapted only to an environment given as training data.

Example embodiments to be described below may provide on-device learning technology in which vehicles exported to other countries run on the roads of the other countries and learn on their own by generating unlimited amounts of training data based on knowledge distillation, which is to be described below, and refining the training data gathered in an uncertainty index. Embodiments may be utilized in various domain adaptation fields such as adaptation of driving image recognition per country and adaptation of voice recognition per user.

As will be described in detail later below, example embodiments may generate a second neural network model based on a first neural network model. The first neural network model may be a model already trained through deep learning in a first domain. According to example embodiments, the second neural network model may be generated to be suitable for operation in a second domain. Here, it is possible to automatically label input data of the second domain by utilizing certainty of the first neural network model, without manually labeling the input data of the second domain to generate the second neural network model. In addition, uncertainty of the first neural network model may be utilized together to improve the reliability of the second domain.

Figure 2:
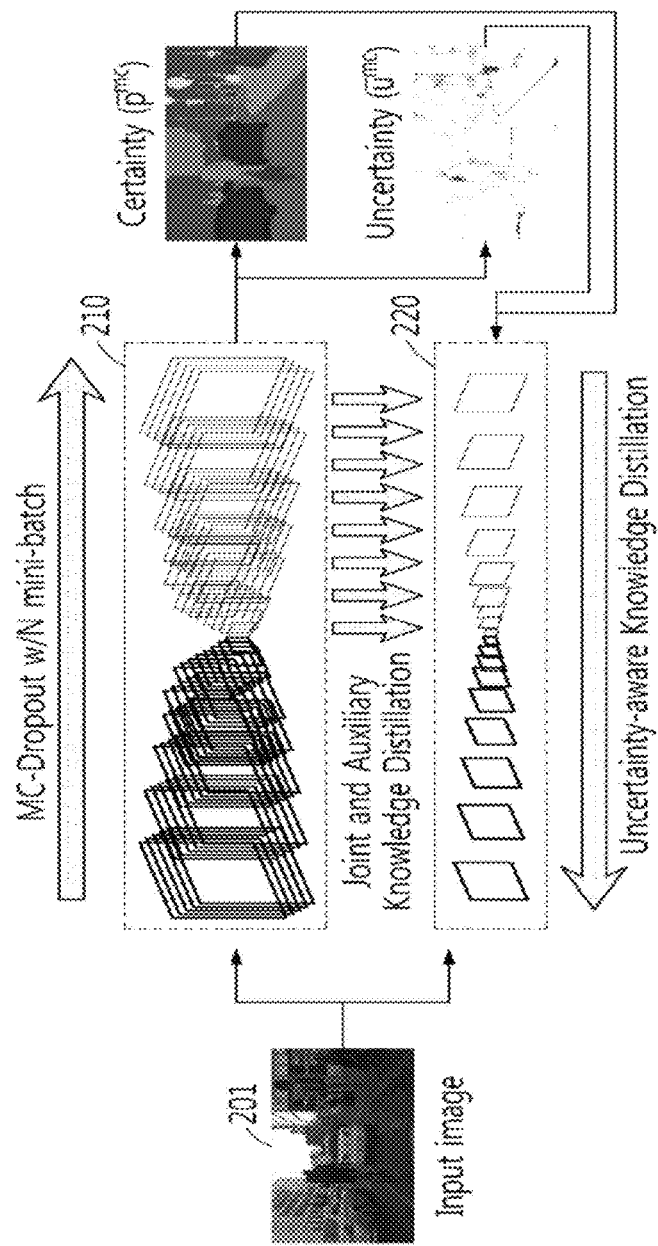
FIG. 2 is a view illustrating a method of generating a second neural network model according to an example embodiment.

FIG. 2 is a view illustrating a method of generating a second neural network model, according to an example embodiment. FIG. 2 shows a first neural network model 210 and a second neural network model 220 according to an example embodiment.

When an input image 201 is received, the first neural network model 210 may derive certainty and uncertainty through drop-out, as shown on the right side of FIG. 2. According to an example embodiment, certainty and uncertainty may be determined statistically based on iterative operations through random drop-out. Certainty refers to a result of the most probable high reliability that the first neural network model 210 may infer and uncertainty may be information showing in which area the inference of the first neural network model 210 is unstable.

The input image 201 may be an unlabeled image of the second domain. The first neural network model 210 may vary prediction results by dropping out any node during recognition of the input image 201. According to an example embodiment, any node(s) included in the last layer of an encoder in a neural network or in the first layer of a decoder may be dropped out. Node(s) included in another layer may also be dropped out according to an example embodiment.

Output of the dropped node(s) may not be transmitted to the next layer in a corresponding iteration. A plurality of iterations processed using a random drop-out corresponding to identical input data may be referred to as a mini-batch.

Through the random drop-out, prediction results output from the first neural network model 210 may be different for each iteration. According to an example embodiment, an average of the prediction results is used as certainty, and a variance of the prediction results may be used as uncertainty. Certainty and uncertainty will be described later below in detail with reference to FIG. 3.

The second neural network model 220 may be generated based on both certainty and uncertainty. For example, the second neural network model 220 may be trained based on loss that is obtained by taking both certainty and uncertainty into account. The technique of training the second neural network model 220 according to example embodiments may be referred to as an uncertainty-aware knowledge distillation technique in that uncertainty as well as certainty are considered together and that labeling of unlabeled input data is automatically performed.

In an example embodiment, even in a case where a new input image of a situation that is not similar to data, used for training through such certainty and uncertainty, is input, the first neural network model 210 may obtain useful information (e.g., uncertainty area and correct answers obtained statistically in the uncertainty area) for training the second neural network model 220. The first neural network model 210 may train itself by re-training the second neural network model 220 using the uncertainty area and the correct answers obtained statistically in the uncertainty area. The first neural network model 210 and the second neural network model 220 will be described later below in detail with reference to FIG. 4.

Figure 3:
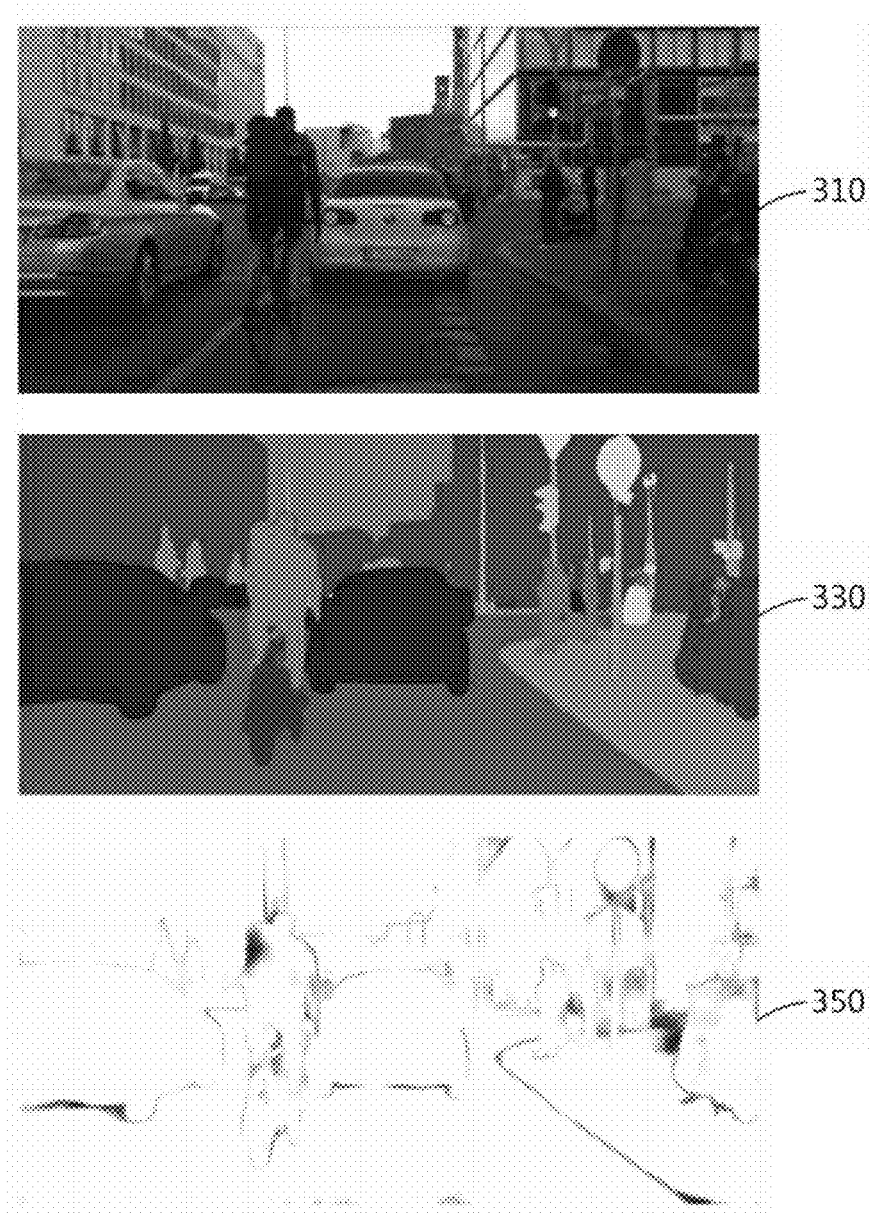
FIG. 3 is a view for explaining a prediction result corresponding to input data and a distribution degree of the prediction result, according to an example embodiment.

FIG. 3 is a view for explaining a prediction result corresponding to input data and a degree of distribution of the prediction result, according to an example embodiment; FIG. 3 shows input data 310, a prediction result 330 corresponding to the input data 310, and a degree of distribution 350 of the prediction result 330.

A first neural network model according to an example embodiment may predict a class label of objects included in the input data 310 by using various segmentation techniques and obtain the prediction result 330. The prediction result 330 may correspond to the above-described certainty and indicate reliability having the highest probability that the first neural network model may infer. The prediction result 330 may be an average of prediction results according to a plurality of iterations, and may be mapped to information (e.g., color, etc.) indicating a class of an object for each pixel.

In order to generate a posterior distribution of class labels of pixels included in the input data 310, that is, the degree of distribution 350 of the prediction result, the first neural network model may use, for example, Monte Carlo sampling and Bayesian approach, to randomly drop-out some of a plurality of nodes in the first neural network model.

The degree of distribution 350 of the prediction result indicates uncertainty in which area the inference of the first neural network model is unstable. The uncertainty occurs, for example but not limited to, due to 1) deviation among people who generate labels, 2) classes that are difficult to distinguish from each other, and 3) classes that are not predefined. The degree of distribution 350 may be a variance of prediction results according to a plurality of iterations, and may be expressed as information that indicates uncertainty by pixel (e.g., probability, etc.). The greater the variance of the prediction results is, the greater the uncertainty is.

The uncertainty due to 1) deviation among people who generate label may occur at a boundary of classes. In the example of input data 310 of FIG. 3, each annotator may not always annotate the boundary of a "car" exactly with the same rule as each other. The uncertainly due to 2) classes that are difficult to distinguish from each other may occur, for example, in a "tree" class and a "grass" class in green color. It may be difficult to distinguish the "tree" class from the "grass" class because both the "tree" class and the "grass" class have the characteristic of green color. The uncertainty due to 3) classes that are not predefined may occur, for example, when a class called "backpack" is not defined in training data for "backpack" that a cyclist wears. This uncertainty is an indicator that may be significantly reduced if a corresponding class appears in much of the training data. In an example embodiment, this uncertainty, that is, the degree of exposure in the training data or the degree of distribution of prediction results may be predicted so that a situation similar to data used for training may be distinguished from a situation not similar to the data used for training.

Figure 4:
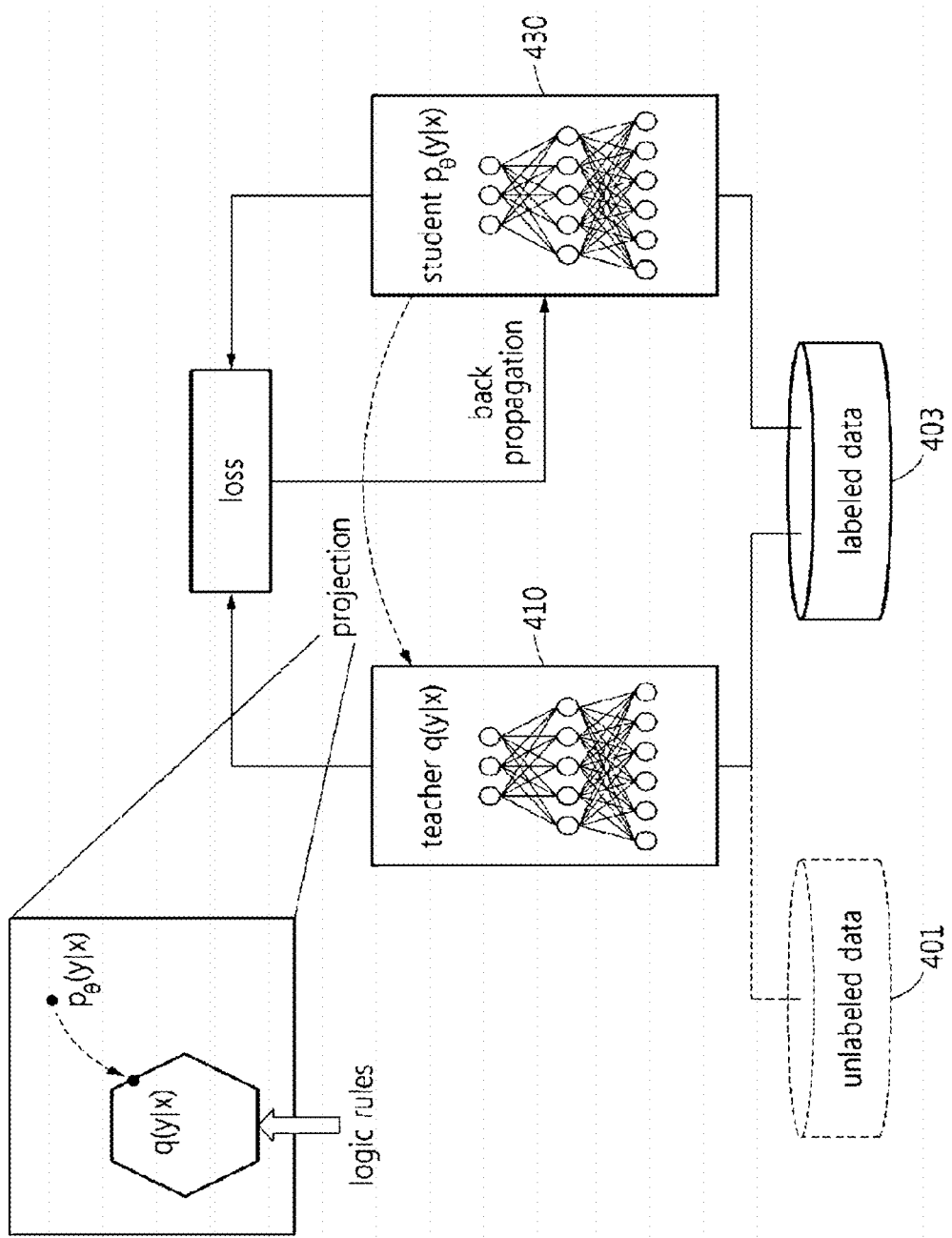
FIG. 4 is a view for explaining a knowledge distillation process between a first neural network model and a second neural network model, according to an example embodiment.

FIG. 4 is a view for explaining a knowledge distillation process between a first neural network model and a second neural network model, according to an example embodiment. FIG. 4 shows unlabeled data 401, labeled data 403, a teacher model 410, and a student model 430.

Knowledge distillation may also be referred to as 'Dark Knowledge', and is a method of teaching the student model 430 a result of inputting the unlabeled data 401 to the teacher model 410 that has been sufficiently trained and performs well. In other words, the knowledge distillation is a method of re-expressing the knowledge that the teacher model 410 learns in the style of the teacher model 410 and propagating the knowledge to the student model 430.

In this manner, an unlimited amount of the unlabeled data 401 that cannot be used as training data in supervised learning may be provided to the teacher model 410 and a correct answer provided by the teacher model 410 may be annotated, thereby generating an unlimited amount of training data.

FIG. 4 is a view for explaining an operation of an apparatus for generating a neural network according to an example embodiment to train the student model 430 using the teacher model 410 that is pre-trained.

The teacher model 410 may include, for example, a neural network as a trained model to generate specific output data for specific input data. The neural network is a recognition model that mimics computational capabilities of biological systems using a plurality of artificial neurons connected by a connection line. The neural network uses artificial neurons that simplify the function of biological neurons, and artificial neurons may be interconnected via the connection line with a connection weight. The connection weight, which is a parameter of the neural network, is a value of the connection line and may indicate a connection strength. The neural network may perform a human cognitive or learning process through the artificial neurons. An artificial neuron of the neural network may be referred to as a node.

The neural network may include a plurality of layers. For example, the neural network may include an input layer, one or more hidden layers, and an output layer. The input layer may receive input data for training the neural network and transmit the input data to the hidden layer, and the output layer may generate output data of the neural network based on a signal received from nodes of the hidden layer. One or more hidden layers may be placed between the input layer and the output layer and input data passed through the input layer may be converted into a predictable value. Nodes included in the input layer and the one or more hidden layers may be connected to each other through the connection line having the connection weight, and nodes included in the hidden layer and the output layer may be connected to each other through the connection line having the connection weight. The input layer, the one or more hidden layers, and the output layer may include a plurality of nodes. The hidden layer may be a convolution filter or a fully connected layer in a convolutional neural network (CNN), or may represent various types of filters or layers that are grouped based on a particular function or feature.

A neural network including a plurality of hidden layers among neural networks is referred to as a deep neural network. Training the deep neural network is referred to as deep learning. Among nodes of the neural network, a node included in the hidden layer is referred to as a hidden node.

The student model 430 may be trained through supervised learning. Supervised learning is a method of, when input data is input to the neural network and output data corresponding to the input data is obtained, making the output data of the neural network converged to actual data by updating a connection weight of connection lines so that the output data coincides with the actual data to be acquired from the input data. The apparatus for generating a neural network according to an example embodiment may train the student model 430 using a delta rule and back propagation learning. In more detail, the neural network generating apparatus may train the student model 430 by updating a connection weight between the nodes included in the student model 430, considering both certainty and uncertainty of the teacher model 410. Learning or training a neural network may be understood as training a parameter of the neural network. In addition, the trained neural network may be understood as a neural network to which a trained parameter is applied.

The teacher model 410 and the student model 430 to which the neural network generating apparatus according to an example embodiment is applied may identify, for example, objects included in input data in an image form. In more detail, the teacher model 410 and the student model 430 may classify the objects included in the input data into preset classes (e.g., a vehicle, a pedestrian, a road, and the like). The neural network generating apparatus may input the input data to the teacher model 410 to obtain label values generated by the teacher model 410 from the input data. The neural network generating apparatus may determine uncertainty based on a variance of values that the teacher model 410 predicts from the input data.

Figure 5:
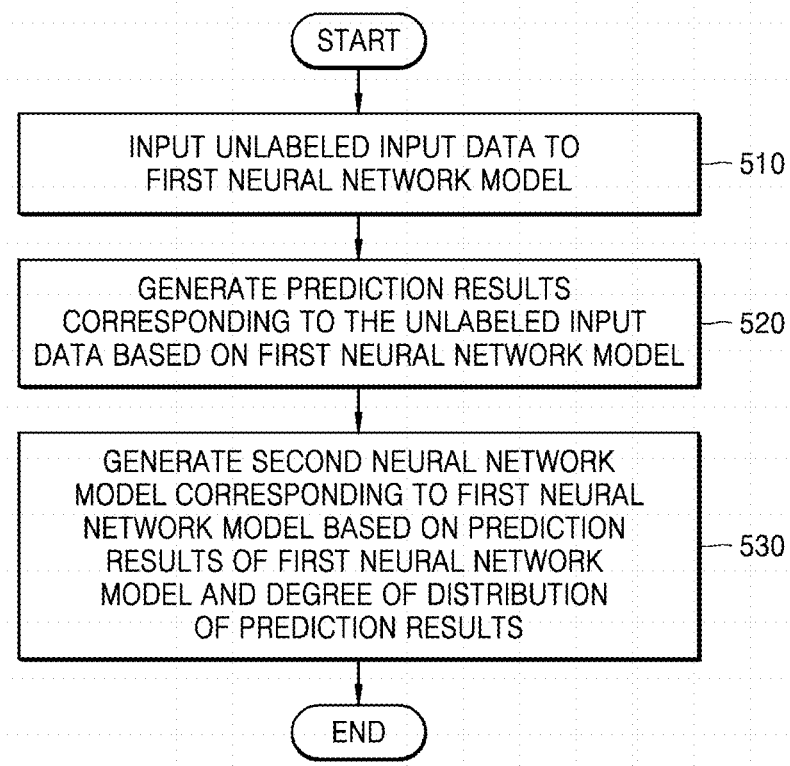
FIG. 5 is a flowchart illustrating a method of generating a second neural network model, according to an example embodiment.

FIG. 5 is a flowchart illustrating a method of generating a second neural network model, according to an example embodiment.

Referring to FIG. 5, in operation 510, an apparatus for generating a second neural network model according to an example embodiment (hereinafter, a neural network generating apparatus) inputs unlabeled input data to a first neural network model. The first neural network model may include a plurality of nodes. The first neural network model may be the teacher model described above. The neural network generating apparatus may randomly drop-out some of the plurality of nodes of the first neural network model to repeatedly predict prediction results corresponding to the input data. The neural network generating apparatus may obtain an average of the repeatedly predicted prediction results and determine a pseudo label of the input data based on the average of the prediction results.

In operation 520, the neural network generating apparatus generates a prediction result corresponding to the unlabeled input data based on the first neural network model. For example, when the input data is an image, the neural network generating apparatus may predict a class of an object included in the input data, and/or predict the location and size of a bounding box for detecting the object included in the input data. When the input data is a navigation image, a first domain may be a first country and a second domain may be a second country.

Alternatively, when the input data is voice, the neural network generating apparatus may recognize voice included in the input data. When the input data is voice, the first domain may be a first user and the second domain may be a second user.

In operation 530, the neural network generating apparatus generates the second neural network model corresponding to the first neural network model based on prediction results of the first neural network model and the degree of distribution of the prediction results. The neural network generating apparatus may train the second neural network model by giving a weight to the prediction results, the weight being proportional to distribution information (e.g., the distribution degree) of the prediction results. For example, the neural network generating apparatus may train the second neural network model based on a value obtained by multiplying the prediction results of the first neural network model by the distribution information (e.g., the distribution degree) of the prediction results. The distribution information of the prediction results may be, for example, the degree of distribution of the prediction results.

The second neural network model may be, for example, the student model described above. Depending on an example embodiment, the second neural network model may include the same or fewer number of hidden layers than those of the first neural network model, or may include the same or fewer number of filters or nodes than those of the first neural network model. The second neural network model may include a neural network that is lighter than that of the first neural network model by model compression. According to an example embodiment, the compressed second neural network model may be mounted on an advanced driver assistance system (ADAS) and a recognizer of an autonomous vehicle.

Figure 6:
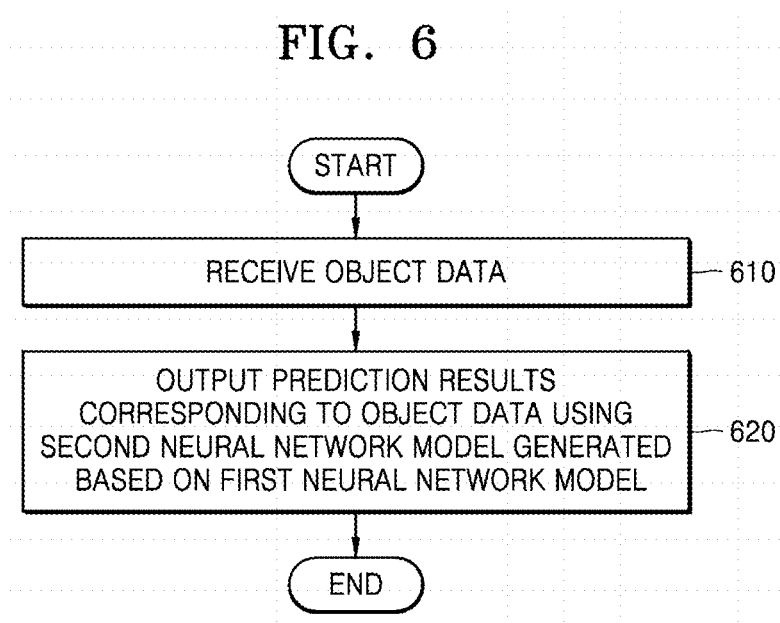
FIG. 6 is a flowchart illustrating a method of outputting a prediction result according to an example embodiment.

FIG. 6 is a flowchart illustrating a method of outputting a prediction result according to an example embodiment.

Referring to FIG. 6, in operation 610, a device for outputting a prediction result according to an example embodiment (hereinafter, an 'output device') receives object data. Object data refers to data to be recognized based on the second neural network model that has been trained through the above-described process, and may include, for example but not limited to, image data, video data, voice data, time-series data, sensor data, or various combinations thereof.

In operation S620, the output device outputs a prediction result corresponding to the object data using a second neural network model, the second neural network model being generated based on a first neural network model. Here, the prediction result is divided into, based on a degree of distribution of the predicted result, a first section indicating that the object data corresponds to a pseudo label corresponding to a prediction result of the first neural network model, a second section in which it is unknown that the object data corresponds to the pseudo label corresponding to the prediction result, and a third section indicating that the object data does not correspond to the pseudo label corresponding to the prediction result. The first section may be referred to as a 'positive section', the second section as an 'uncertainty section', and the third section as a 'negative section'. Furthermore, the first section and third section may be referred to as a 'certainty section' because the first section and third section are sections in which whether the object data corresponds to the pseudo label corresponding to the prediction result may be known.

The first neural network model may output prediction results corresponding to the first and third sections (that is, outputting the first section indicating that the object data corresponds to the prediction result of the first neural network model and the third section indicating that the object data does not correspond to the prediction result of the first neural network), and the second neural network model may output prediction results corresponding to the first to third sections.

Here, the second neural network model may be trained by different weights given to the respective sections according to the degree of distribution of prediction results obtained by the first neural network model. The second neural network model may be trained by training data generated based on a prediction result obtained by inputting input data to the first neural network model corresponding to the second neural network model and the degree of distribution of the prediction result.

In an example embodiment, a neural network constituting the first neural network model and the second neural network model may be used for various purposes as well as for identifying an object included in input data of an image form. For example, the first neural network model may detect or recognize the face of a person included in the input data from the input data of the image form. In this case, the second neural network model may be trained based on training data generated by refining a result of detecting or recognizing the face of the person by the first neural network model in correspondence with the input data. As another example, the first neural network model may convert voice data into text data. In this case, the second neural network model may learn training data generated by refining the text data output by the first neural network model in correspondence with the voice data. In addition, neural networks may be used for emotion detection or recognition and context detection or recognition.

The second neural network model may output information obtained from object data, wherein the information output may be similar to information obtained from the input data by the first neural network model. For example, when the first neural network model expresses the type of an object included in the input data of the image form by using a probability that the type of the object is matched with each of a plurality of preset classes, the second neural network model may express the type of an object included in object data of an image form by using a probability that the type of the object is matched with each of the plurality of preset classes.

Figure 7:
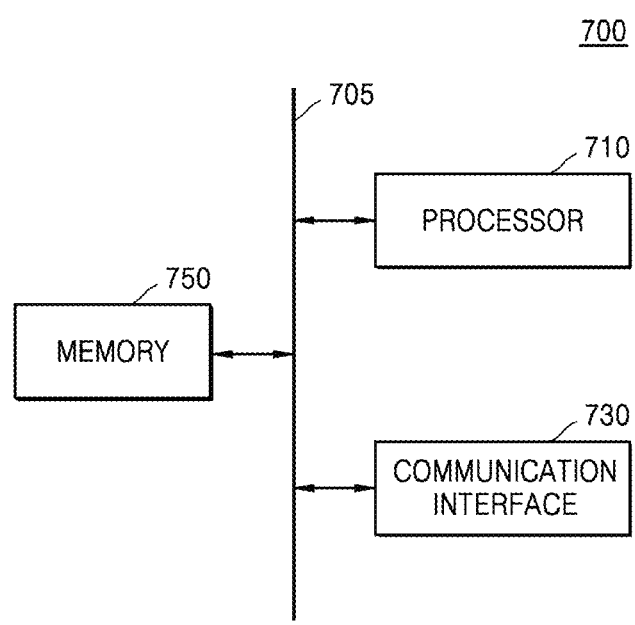
FIG. 7 is a block diagram of an apparatus for generating a second neural network model, according to an example embodiment.

FIG. 7 is a block diagram of a device for generating a second neural network model, according to an example embodiment.

Referring to FIG. 7, a neural network generating apparatus 700 according to an example embodiment includes a processor 710, a communication interface 730, and a memory 750. The processor 710, the communication interface 730, and the memory 750 may communicate with each other via a communication bus 705.

The processor 710 inputs unlabeled input data received via the communication interface 730 to a first neural network model. The processor 710 generates prediction results corresponding to the unlabeled input data based on the first neural network model. The processor 710 generates the second neural network model corresponding to the first neural network model based on the prediction results of the first neural network model and a degree of distribution of the prediction results.

The first neural network model may include a plurality of nodes and a plurality of layers. The processor 710 may randomly drop-out some of the plurality of nodes of the first neural network model to repeatedly predict prediction results corresponding to the input data.

In addition, the processor 710 may perform at least one method described above with respect to FIGS. 1 to 6 and/or an algorithm corresponding to the at least one method. The processor 710 may be a data processing device implemented in hardware having a circuit with a physical structure for performing desired operations. For example, desired operations may include code or instructions included in a program. For example, a data processing device implemented in hardware may be a microprocessor, a central processing unit, a processor core, a multi-core processor, a multiprocessor, an application-specific integrated circuit (ASIC), and a field programmable gate array (FPGA).

The processor 710 may execute the program and control the neural network generating apparatus 700. Program code executed by the processor 710 may be stored in the memory 750.

The memory 750 may store various pieces of information generated in a process of the processor 710 described above. In addition, the memory 750 may store various data, programs, and the like. The memory 750 may include volatile memory or nonvolatile memory. The memory 750 may include a mass storage medium such as a hard disk to store various data.

The method of the inventive concept may be implemented as computer commands which may be executed by various computer means, and recorded on a computer-readable recording medium. The computer-readable recording medium may include program commands, data files, data structures or a combination thereof. Program instructions recorded on the medium may be particularly designed and structured for example embodiments or available to those skilled in computer software. Examples of the computer-readable recording medium include magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, random-access memories (RAMs), or flash memories). Program commands may include, for example, high-level language code that can be executed by a computer using an interpreter, as well as machine language code made by a complier. The above hardware devices may be configured to operate as one or more software modules to perform the operations of the example embodiments, and vice versa.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

Although the example embodiments have been described with reference to the accompanying drawings, one of ordinary skill in the art will understand that various changes and modifications may be made to the example embodiments. For example, the relevant results may be achieved even when the described technologies are performed in a different order than the described methods, and/or even when the described components such as systems, structures, devices, and circuits are coupled or combined in a different form than the described methods or are replaced or substituted by other components or equivalents. It should be understood that example embodiments described herein should be considered in a descriptive sense only and not for purposes of limitation. Descriptions of features or aspects within each example embodiment should typically be considered as available for other similar features or aspects in other example embodiments. Therefore, other implementations, other embodiments, and equivalents to the claims are also within the scope of the following claims.

What is claimed is:

1. A method of generating a neural network model, the method comprising:
   inputting unlabeled input data to a first neural network model;
   predicting a class label of the unlabeled input data by obtaining prediction results corresponding to the unlabeled input data based on the first neural network model;
   obtaining a posterior distribution of the prediction results, wherein a greater degree of the posterior distribution of the prediction results indicates a greater uncertainty in the class label; and
   generating a second neural network model based on the prediction results and a degree of the posterior distribution of the prediction results,
   wherein the first neural network model comprises a plurality of nodes, and the obtaining the posterior distribution comprises:
   randomly dropping out at least a portion of the plurality of nodes of the first neural network model to repeatedly obtain the prediction results corresponding to the unlabeled input data;
   obtaining an average of the repeatedly obtained prediction results; and
   determining a pseudo label of the unlabeled input data based on the average of the prediction results.

2. The method of claim 1, wherein the generating the second neural network model comprises:
   training the second neural network model based on a value obtained by multiplying the prediction results of the first neural network model by the degree of the posterior distribution of the prediction results.

3. The method of claim 1, wherein the training comprises:
training the second neural network model by applying a weight to the prediction results, the weight being proportional to the degree of the posterior distribution of the prediction results.

4. The method of claim 1, wherein the obtaining comprises, in response to the unlabeled input data being an image:
predicting a class of an object included in the unlabeled input data; and
predicting a bounding box for detecting the object included in the unlabeled input data.

5. The method of claim 1, wherein the obtaining comprises, in response to the unlabeled input data being voice:
recognizing the voice included in the unlabeled input data.

6. The method of claim 1, wherein the generating comprises generating the second neural network model that corresponds to a result of on-device learning based on the first neural network model or a result of domain adaptation based on the first neural network model.

7. A non-transitory computer readable storage medium storing computer program, which, when executed by at least one processor, causes the at least one processor to execute the method of claim 1.

8. An apparatus for generating a neural network model, the apparatus comprising:
a communication interface configured to receive unlabeled input data; and
at least one processor configured to:
input the unlabeled input data to a first neural network model;
predict a class label of the unlabeled input data by obtaining prediction results corresponding to the unlabeled input data based on the first neural network model;
obtain a posterior distribution of the prediction results, wherein a greater degree of the posterior distribution of the prediction results indicates a greater uncertainty in the class label; and
generate a second neural network model based on the prediction results and a degree of the posterior distribution of the prediction results,
wherein the first neural network model comprises a plurality of nodes, and the at least one processor is configured to:
randomly drop out at least a portion of the plurality of nodes of the first neural network model to repeatedly obtain the prediction results corresponding to the unlabeled input data;
obtain an average of the repeatedly obtained prediction results; and
determine a pseudo label of the unlabeled input data based on the average of the prediction results.

9. The apparatus of claim 8, wherein the at least one processor is configured to train the second neural network model based on a value obtained by multiplying the prediction results of the first neural network model by the degree of the posterior distribution of the prediction results.

10. The apparatus of claim 9, wherein the at least one processor is configured to train the second neural network model by applying a weight to the prediction results, the weight being proportional to the degree of the posterior distribution of the prediction results.

11. The apparatus of claim 8, wherein the at least one processor, in response to the unlabeled input data being an image, is configured to:
predict a class of an object included in the unlabeled input data; and
predict a bounding box for detecting the object included in the unlabeled input data, or predict the class of the object included in the unlabeled input data and the bounding box for detecting the object included in the unlabeled input data.

12. The apparatus of claim 8, wherein the at least one processor, in response to the unlabeled input data being voice, is configured to recognize the voice included in the unlabeled input data.

* * * * *